(12) United States Patent
Chandrasekar et al.

(10) Patent No.: US 7,499,915 B2
(45) Date of Patent: Mar. 3, 2009

(54) INDEX FOR ACCESSING XML DATA

(75) Inventors: Sivasankaran Chandrasekar, Palo Alto, CA (US); Ravi Murthy, Fremont, CA (US); Ashish Thusoo, Foster City, CA (US); Anh-Tuan Tran, Vacaville, CA (US); Sreedhar Mukkamalla, San Francisco, CA (US); Eric Sedlar, San Francisco, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 481 days.

(21) Appl. No.: 10/884,311

(22) Filed: Jul. 2, 2004

(65) Prior Publication Data

US 2005/0228792 A1    Oct. 13, 2005

Related U.S. Application Data

(60) Provisional application No. 60/560,927, filed on Apr. 9, 2004, provisional application No. 60/580,445, filed on Jun. 16, 2004.

(51) Int. Cl.
*G06F 17/30* (2006.01)
(52) U.S. Cl. ............. 707/3; 707/E17.012; 707/E17.083
(58) Field of Classification Search ............. 707/2, 707/3, 101, 102, 104.1, E17.012, E17.083
See application file for complete search history.

(56) References Cited

U.S. PATENT DOCUMENTS 5,210,686 A    5/1993   Jernigan
5,369,763 A    11/1994  Biles
5,404,513 A    4/1995   Powers et al.

(Continued)

FOREIGN PATENT DOCUMENTS

WO    WO 01/42881 A2    6/2001

(Continued)

OTHER PUBLICATIONS

Bourret, R. et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

*Primary Examiner*—Leslie Wong
(74) *Attorney, Agent, or Firm*—Hickman Palermo Truong & Becker LLP

(57) ABSTRACT

Techniques are provided for indexing XML documents. According to one embodiment, a PATH table created for storing one row for each indexed node of the XML documents. The PATH table row for a node includes (1) information for locating the XML document that contains the node, (2) information that identifies the path of the node, and (3) information that identifies the position of the node within the hierarchical structure of the XML document that contains the node. If the node is associated with the value, then the PATH table row for the node may also include the value. Use of the PATH table to answer XPath queries is facilitated by secondary indexes.

28 Claims, 6 Drawing Sheets

U.S. PATENT DOCUMENTS

| | | | |
|---|---|---|---|
| 5,410,691 A | 4/1995 | Taylor | |
| 5,454,101 A | 9/1995 | Mackay et al. | |
| 5,467,471 A | 11/1995 | Bader | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |
| 5,568,640 A | 10/1996 | Nishiyama et al. | |
| 5,680,614 A | 10/1997 | Bakuya et al. | |
| 5,701,467 A | 12/1997 | Freeston | |
| 5,838,965 A | 11/1998 | Kavanagh et al. | |
| 5,842,212 A | 11/1998 | Balluvio et al. | |
| 5,917,492 A | 6/1999 | Bereiter et al. | |
| 5,921,582 A | 7/1999 | Gusack | |
| 5,964,407 A | 10/1999 | Sandkleiva | |
| 5,974,407 A | 10/1999 | Sacks | |
| 6,055,544 A | 4/2000 | DeRose et al. | |
| 6,101,500 A | 8/2000 | Lau | |
| 6,111,578 A | 8/2000 | Tesler | |
| 6,112,209 A | 8/2000 | Gusack | |
| 6,128,610 A | 10/2000 | Srinivasan et al. | |
| 6,141,655 A | 10/2000 | Johnson et al. | |
| 6,182,121 B1 | 1/2001 | Wlaschin | |
| 6,192,273 B1 | 2/2001 | Igel et al. | |
| 6,192,373 B1 | 2/2001 | Haegele | |
| 6,208,993 B1 | 3/2001 | Shadmon | |
| 6,236,988 B1 | 5/2001 | Aldred | |
| 6,279,007 B1 | 8/2001 | Uppala | |
| 6,330,573 B1 | 12/2001 | Salisbury et al. | |
| 6,370,537 B1 | 4/2002 | Gilbert et al. | |
| 6,427,123 B1 | 7/2002 | Sedlar | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,539,398 B1 | 3/2003 | Hannan et al. | |
| 6,604,100 B1 | 8/2003 | Fernandez et al. | |
| 6,609,121 B1 | 8/2003 | Ambrosini et al. | |
| 6,636,845 B2 | 10/2003 | Chau et al. | |
| 6,643,633 B2 | 11/2003 | Chau et al. | |
| 6,684,227 B2 | 1/2004 | Duxbury | |
| 6,725,212 B2 | 4/2004 | Couch et al. | |
| 6,772,350 B1 | 8/2004 | Belani et al. | |
| 6,826,727 B1 | 11/2004 | Mohr et al. | |
| 6,836,857 B2 | 12/2004 | Ten-Hove et al. | |
| 6,920,457 B2 | 7/2005 | Pressmar | |
| 7,043,488 B1 | 5/2006 | Bauer et al. | |
| 7,047,253 B1 | 5/2006 | Murthy et al. | |
| 7,089,239 B1 | 8/2006 | Baer et al. | |
| 7,139,746 B2 * | 11/2006 | Shin et al. | 707/2 |
| 7,162,485 B2 * | 1/2007 | Gottlob et al. | 707/102 |
| 7,171,404 B2 * | 1/2007 | Lindblad et al. | 707/3 |
| 2002/0078068 A1 | 6/2002 | Krishnaprasad et al. | |
| 2002/0103829 A1 | 8/2002 | Manning et al. | |
| 2002/0143512 A1 | 10/2002 | Shamoto et al. | |
| 2002/0152267 A1 * | 10/2002 | Lennon | 709/203 |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2002/0188613 A1 | 12/2002 | Chakraborty et al. | |
| 2003/0009361 A1 | 1/2003 | Hancock et al. | |
| 2003/0065659 A1 | 4/2003 | Agarwal et al. | |
| 2003/0078906 A1 | 4/2003 | Ten-Hove et al. | |
| 2003/0101194 A1 | 5/2003 | Rys et al. | |
| 2003/0131051 A1 | 7/2003 | Lection et al. | |
| 2003/0212662 A1 | 11/2003 | Shin et al. | 707/2 |
| 2003/0212664 A1 * | 11/2003 | Breining et al. | 707/3 |
| 2004/0010752 A1 * | 1/2004 | Chan et al. | 715/513 |
| 2004/0064466 A1 | 4/2004 | Manikutty et al. | |
| 2004/0068494 A1 | 4/2004 | Tozawa et al. | |
| 2004/0088320 A1 | 5/2004 | Perry | |
| 2004/0167904 A1 | 8/2004 | Wen et al. | |
| 2004/0205551 A1 | 10/2004 | Santos | |
| 2005/0050016 A1 * | 3/2005 | Stanoi et al. | 707/3 |
| 2005/0091188 A1 * | 4/2005 | Pal et al. | 707/1 |
| 2005/0228818 A1 | 10/2005 | Murthy et al. | |
| 2006/0129584 A1 | 6/2006 | Hoang et al. | |

FOREIGN PATENT DOCUMENTS

| | | |
|---|---|---|
| WO | WO 03/027908 A2 | 4/2003 |

OTHER PUBLICATIONS

Cheng, Josephine et al., "IBM DB2 XML Extender," IEEE, ICDE '00 Conference, San Diego, Feb. 2000, 128 pages.

Chae, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Noser, Hansrudi et al., "Dynamic 3D Visualization of Database-Defined Tree Structures on the WWW by Using Rewriting Systems," 2000, IEEE, XP-002262516, pp. 247-254.

Vorthmann, S. et al. "Beyond Schemas, Schema Adjuncts and the Outside World," Markup Languages, Online!, vol. 2, No. 3, Jun. 2000, pp. 1-8.

Daniele Braga et al., "A Graphical Environment to Query XML Data with Query," Proceedings of the Fourth International Conference on Web Information Systems Engineering (WISE '03), 2003, IEEE, 10 pages.

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Wed data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

McHugh, Jason et al., "Query Optimization for XML", XP-002333353, Proceedings of the 25th VLDB Conference (1999) pp. 315-326.

Yoshikawa, Masatoshi et al., "XRel: A Path-Based Approach to Storage and Retrieval of XML Documents Using Relational Databases", XP-001143686, ACM Transactions on Internet Technology (2001), pp. 110-141.

Notification of Transmittal of the International Search Report and the Written Opinion of the International Searching Authority, or the Declaration received from International application No. PCT/US2005/011762.

Pending claims from International application No. PCT/US2005/011762.

Diao, Y. et al., "Path Sharing and Predicate Evaluation for High-Performance XML Filtering" XP-002344354 ACM Transactions on Database Systems (2003), pp. 467-516.

Diao, Y. et al., "YFilter: Efficient and Scalable Filtering of XML Documents" IEEE (2002) 2 pages.

Helmer, S. et al., "Optimized Translations of XPath into Algebraic Expressions Parameterized by Programs Containing Navigational Primitives" IEEE (2002) 10 pages.

Notification of Transmittal of the International Search Report and the Written Opinion of the International Searching Authority, or the Declaration for pending international application No. PCT/US2005/020802.

Pending claims for pending international application No. PCT/US2005/020802.

International Searching Authority, "Notification of Transmittal of the International Search Report and the Written Opinion of the International Searching Authority, or the Declaration," PCT/US2005/011763, dated Aug. 1, 2005, 12 pages.

Current Claims, PCT/US2005/011763, 5 pages.

Cooper, Brian F. et al., "A Fast Index for Semistructured Data," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

International Searching Authority, "Notification of the Transmittal of the International Search Report and the Written Opinion of the International Searching Authority, or the Declaration," PCT/US2005/020795, Mailing Date Sep. 27, 2005, 13 pages.

Current Claims, PCT/US2005/020795, 5 pages.

Kudrass, Thomas, "Management of XML Documents Without Schema in Relational Database Systems," Information and Software Technology, vol. 44, No. 4, Mar. 31, 2002, XP-004347776, pp. 269-275.

Zhang, Wansong, et al., "An Encoding Scheme for Indexing XML Data," E-Commerce and E-Service, 2004, XP-010697639, pp. 526-529.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

"Written Opinion of the International Preliminary Examining Authority" in International application No. PCT/US2005/020795.

"XML Fragment Interchange" *W3C* (1998) pp. 1-16.

International Preliminary Examining Authority, "Notification of Transmittal of the International Preliminary Report of Patentability," PCT/US2005/020795, dated Aug. 7, 2006, 10 pages.

International Preliminary Examining Authority, "Written Opinion of the International Preliminary Examining Authority," PCT/US2005/020795, received May 31, 2006, 5 pages.

Claims, PCT/US2005/020795, 3 pages.

W3C, "XML Fragment Interchange," W3C Working Draft, Jun. 30, 1999, XP-002167090, 17 pages.

MacKenzie, David et al., "Finding Files", GNU Findutils Version 4.1.2, Nov. 1994, 38 pages.

"Notice of Allowance and Fee Due" received in U.S. Appl. No. 10/944,170 dated Apr. 7, 2008, 8 pages.

Priti, Patil et al., "Holistic Schema Mappings for XML-on-RDBMS", Database systems for advanced applications, vol. 3882, Lecture notes in Computer Science, Springer-Verlag, Jan. 1, 2006, 16 pages.

Hammerschmidt, B C et al., "Autonomous Index Optimization in XML Databases", 21st International Conference on Data Engineering, XP010924124, IEEE, Apr. 5, 2005, 10 pages.

European Patent Office, "International Search Report", PCT/US2008/052932, dated Jun. 13, 2008, 13 pages.

Claims, PCT/US2008/052932, 4 pages.

* cited by examiner

INDEX FOR ACCESSING XML DATA

PRIORITY CLAIM

This application claims priority to U.S. Provisional Patent Application Ser. No. 60/560,927, entitled XML INDEX FOR XML DATA STORED IN VARIOUS STORAGE FORMATS, filed on Apr. 9, 2004; and U.S. Provisional Patent Application No. 60/580,445, entitled XML INDEX FOR XML DATA STORED IN VARIOUS STORAGE FORMATS, filed on Jun. 16, 2004, the contents of which are herein incorporated by reference in their entirety for all purposes.

FIELD OF THE INVENTION

The present invention relates to managing information and, more specifically, accessing information contained in XML documents.

BACKGROUND

In recent years, there are many database systems that allow storage and querying of extensible Markup Language data ("XML data"). Though there are many evolving standards for querying XML, all of them include some variation of XPath. However, database systems are usually not optimized to handle XPath queries, and the query performance of the database systems leaves much to be desired. In specific cases where an XML schema definition may be available, the structure and datatypes used in XML instance documents may be known. However, in cases where an XML schema definition is not available, and the documents to be searched do not conform to any schema, there are no efficient techniques for querying using XPath.

Some database systems may use ad-hoc mechanisms to satisfy Xpath queries that are run against documents where the schema of the documents is not known. For example, a database system may satisfy an XPath query by performing a full scan of all documents. While a full scan of all documents can be used to satisfy all XPath queries, the implementation would be very slow due to the lack of indexes.

Another way to satisfy XPath queries involves the use of text keywords. Specifically, many database systems support text indexes, and these could be used to satisfy certain XPaths. However, this technique can only satisfy a small subset of XPath queries. Thus, there have been no effective indexing techniques in existing database systems that can be used to handle a wide variety of XPath queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
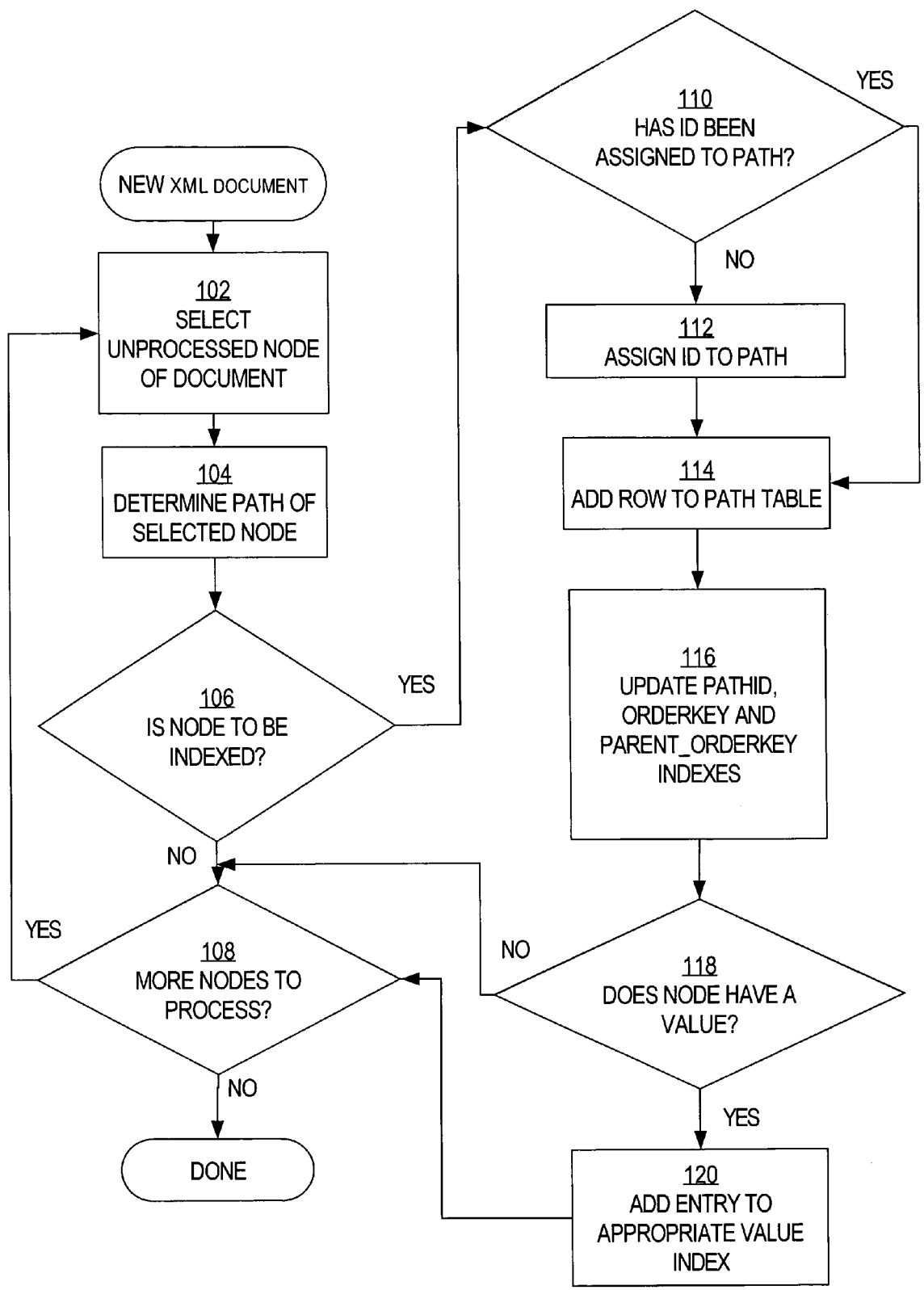
FIG. 1 is a flowchart illustrating steps for updating an XML index based on a new XML document.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Functional Overview

A mechanism is provided for indexing paths, values and order information in XML documents. The mechanism may be used regardless of the format and data structures used to store the actual XML data (the "base structures"). For example, the actual XML data can reside in structures within or outside of a database, in any form, such as CLOB (character LOB storing the actual XML text), O-R (object relational structured form in the presence of an XML schema), or BLOB (binary LOB storing some binary form of the XML).

The techniques described herein involve using a set of structures, which collectively constitute an index, for accessing XML data. According to one embodiment, the index (referred to herein as an "XML index") includes three logical structures: a path index, an order index and a value index. In one embodiment, all three logical structures reside in a single table, referred to herein as the PATH_TABLE.

The most commonly used parts of the XPath query language include navigational (parent-child-descendent) access and predicates based on value. As shall be described in greater detail hereafter, by virtue of tracking paths, value and order information, the XML index can be used to satisfy both these access methods effectively. In addition, depending on how embodiments of the XML index are implemented, use of the XML index may result in one or more of the following benefits: (1) Improved search performance of XPath-based queries. This includes path matching as well as value predicates. (2) Handling fragment extraction where the fragment is identified by a XPath expression. (3) Datatype aware with respect to value predicates—in presence of appropriate XML Schema definitions. (4) Support for ability to evolve XML Schema and XML index by adding new definitions. (5) Handling a large class of XPath expressions—including child and descendant axes, and equality and range predicates. (6) Ability for the user to control the set of indexed paths by including or excluding a specified set of paths or namespaces from the index. This is particularly useful in document-oriented scenarios where tags related to formatting, etc are omitted from the index. (7) Allowing customizations of the actual text value which gets stored in the index. E.g. whitespace stripped, case-insensitive. (8) Good performance on bulk loading of index and support for parallel index creation.

EXAMPLE XML DOCUMENTS

For the purpose of explanation, examples shall be given hereafter with reference to the following two XML documents:

```
po1.xml
<PurchaseOrder>
    <Reference>SBELL-2002100912333601PDT</Reference>
    <Actions>
        <Action>
            <User>SVOLLMAN</User>
        </Action>
    </Actions>
    ....
</PurchaseOrder>
po2.xml
<PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ....
</PurchaseOrder>
```

As indicated above, po1.xml and po2.xml are merely two examples of XML documents. The techniques described herein are not limited to XML documents having any particular types, structure or content. Examples shall be given hereafter of how such documents would be indexed and accessed according to various embodiments of the invention.

The XML Index

According to one embodiment, an XML index is a domain index that improves the performance of queries that include Xpath-based predicates and/or Xpath-based fragment extraction. An XML index can be built, for example, over both XML Schema-based as well as schema-less XMLType columns which are stored either as CLOB or structured storage. In one embodiment, an XML index is a logical index that results from the cooperative use of a path index, a value index, and an order index.

The path index provides the mechanism to lookup fragments based on simple (navigational) path expressions. The value index provides the lookup based on value equality or range. There could be multiple secondary value indexes—one per datatype. The order index associates hierarchical ordering information with indexed nodes. The order index is used to determine parent-child, ancestor-descendant and sibling relationships between XML nodes.

When the user submits a query involving XPaths (as predicate or fragment identifier), the user XPath is decomposed into a SQL query that accesses the XML index table. The generated query typically performs a set of path, value and order-constrained lookups and merges their results appropriately.

The PATH Table

According to one embodiment, a logical XML index includes a PATH table, and a set of secondary indexes. As mentioned above, each indexed XML document may include many indexed nodes. The PATH table contains one row per indexed node. For each indexed node, the PATH table row for the node contains various pieces of information associated with the node.

According to one embodiment, the information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Optionally, the PATH table may also contain value information for those nodes that are associated with values. Each of these types of information shall be described in greater detail below.

Paths

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that an XML index indexes is referred to herein as the "indexed XML documents". According to one embodiment, an XML index may be built on all of the paths within all of the indexed XML documents, or a subset of the paths within the indexed XML documents. Techniques for specifying which paths are index are described hereafter. The set of paths that are indexed by a particular XML index are referred to herein as the "indexed XML paths".

Path IDs

According to one embodiment, each of the indexed XML paths is assigned a unique path ID. For example, the paths that exist in po1.xml and po2.xml may be assigned path IDs as illustrated in the following table:

| PATH ID | PATH |
| --- | --- |
| 1 | /PurchaseOrder |
| 2 | /PurchaseOrder/Reference |
| 3 | /PurchaseOrder/Actions |
| 4 | /PurchaseOrder/Actions/Action |
| 5 | /PurchaseOrder/Actions/Action/User |

Various techniques may be used to identify paths and assign path IDs to paths. For example, a user may explicitly enumerate paths, and specify corresponding path IDs for the paths thus identified. Alternatively, the database server may parse each XML document as the document is added to the set of indexed XML documents. During the parsing operation, the database server identifies any paths that have not already been assigned a path ID, and automatically assigns new path IDs to those paths. The pathid-to-path mapping may be stored within the database in a variety of ways. According to one embodiment, the pathid-to-path mapping is stored as metadata separate from the XML indexes themselves.

According to one embodiment, the same access structures are used for XML documents that conform to different schemas. Because the indexed XML documents may conform to different schemas, each XML document will typically only contain a subset of the paths to which pathids have been assigned.

Location Data

The location data associated with a node indicates where the XML document that contains the node resides within the base structures. Thus, the nature of the location data will vary from implementation to implementation based on the nature of the base structures. Depending on how the actual XML document is stored, the location data may also include a locator or logical pointer to point into the XML document. The logical pointer may be used for extracting fragments that are associated with nodes identified by XPaths.

For the purpose of explanation, it shall be assumed that (1) the base structures are tables within a relational database, and (2) each indexed XML document is stored a corresponding row of a base table. In such a context, the location data for a node may include, for example, (1) the rowid of row, within the base table, in which the XML document containing the node is stored, and (2) a locator that provides fast access within the XML document, to the fragment data, that corresponds to the node.

Hierarchy Data

The PATH table row for a node also includes information that indicates where the node resides within the hierarchical structure of the XML document containing the node. Such hierarchical information is referred to herein as the "Order-Key" of the node.

According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the Orderkey of a child may be easily created by appending to the OrderKey of the parent a value that corresponds to the number of the child. Similarly, the OrderKey of the parent is easily derived from the OrderKey of the child by removing the last number in the Orderkey of the child.

According to one embodiment, the composite numbers represented by each OrderKey are converted into byte-comparable values, so that a mathematical comparison between two OrderKeys indicates the relative position, within the structural hierarchy of an XML document, of the nodes to which the OrderKeys correspond.

For example, the node associated with the OrderKey 1.2.7.7 precedes the node associated with the OrderKey 1.3.1 in the hierarchical structure of an XML document. Thus, the database server uses a conversion mechanism that converts OrderKey 1.2.7.7 to a first value, and to convert OrderKey 1.3.1 to a second value, where the first value is less than the second value. By comparing the second value to the first value, the database server can easily determine that the node associated with the first value precedes the node associated with the second value. Various conversion techniques may be used to achieve this result, and the invention is not limited to any particular conversion technique.

Value Information

Some nodes within an indexed document may be attribute nodes or nodes that correspond to simple elements. According to one embodiment, for attribute nodes and simple elements, the PATH table row also stores the actual value of the attributes and elements. Such values may be stored, for example, in a "value column" of the PATH table. The secondary "value indexes", which shall be described in greater detail hereafter, are built on the value column.

PATH Table Example

According to one embodiment, the PATH table includes columns defined as specified in the following table:

| Column Name | Datatype | Description |
| --- | --- | --- |
| PATHID | RAW(8) | ID for the path token. Each distinct path e.g. /a/b/c is assigned a unique id by the system. |
| RID | UROWID/ ROWID | Rowid of the row in base table. |
| ORDER_KEY | RAW(100) | Dewey order key for the node e.g. 3.21.5 to indicate $5^{th}$ child of $21^{st}$ child of $3^{rd}$ child of root. |
| LOCATOR | RAW(100) | Information corresponding to the starting position for the fragment. This is used during fragment extraction. |
| VALUE | RAW(2000)/ BLOB | Value of the node in case of attributes and simple elements. The type can be specified by the user (as well as the size of the RAW column) |

As explained above, the PATHID is a number assigned to the node, and uniquely represents a fully expanded path to the node. The ORDER_KEY is a system representation of the DEWEY ordering number associated with the node. According to one embodiment, the internal representation of the order key also preserves document ordering.

The VALUE column stores the effective text value for simple element (i.e. no element children) nodes and attribute nodes. According to one embodiment, adjacent text nodes are coalesced by concatenation. As shall be described in greater detail hereafter, a mechanism is provided to allow a user to customize the effective text value that gets stored in VALUE column by specifying options during index creation e.g. behavior of mixed text, whitespace, case-sensitive, etc can be customized. The user can store the VALUE column in any number of formats, including a bounded RAW column or a BLOB. If the user chooses bounded storage, then any overflow during index creation is flagged as an error.

The following table is an example of a PATH table that (1) has the columns described above, and (2) is populated with entries for po1.xml and po2.xml. Specifically, each row of the PATH table corresponds to an indexed node of either po1.xml or po2.xml. In this example, it is assumed that po1.xml and po2.xml are respectively stored at rows R1 and R2 of a base table.

POPULATED PATH TABLE

| rowed | Pathid | Rid | OrderKey | Locator | Value |
|---|---|---|---|---|---|
| 1 | 1 | R1 | 1 | | |
| 2 | 2 | R1 | 1.1 | | SBELL-2002100912333601PDT |
| 3 | 3 | R1 | 1.2 | | |
| 4 | 4 | R1 | 1.2.1 | | |
| 5 | 5 | R1 | 1.2.1.1 | | SVOLLMAN |
| 6 | 1 | R2 | 1 | | |
| 7 | 2 | R2 | 1.1 | | ABEL-20021127121040897PST |
| 8 | 3 | R2 | 1.2 | | |
| 9 | 4 | R2 | 1.2.1 | | |
| 10 | 5 | R2 | 1.2.1.1 | | ZLOTKEY |
| 11 | 4 | R2 | 1.2.2 | | |
| 12 | 5 | R2 | 1.2.2.1 | | KING |

In this example, the rowid column stores a unique identifier for each row of the PATH table. Depending on the database system in which the PATH table is created, the rowid column may be an implicit column. For example, the disk location of a row may be used as the unique identifier for the row. As shall be described in greater detail hereafter, the secondary Order and Value indexes use the rowid values of the PATH table to locate rows within the PATH table.

In the embodiment illustrated above, the PATHID, ORDERKEY and VALUE of a node are all contained in a single table. In alternative embodiment, separate tables may be used to map the PATHID, ORDERKEY and VALUE information to corresponding location data (e.g. the base table Rid and Locator).

Secondary Indexes

The PATH table includes the information required to locate the XML documents, or XML fragments, that satisfy a wide range of queries. However, without secondary access structures, using the PATH table to satisfy such queries will often require full scans of the PATH table. Therefore, according to one embodiment, a variety of secondary indexes are created by the database server to accelerate the queries that (1) perform path lookups and/or (2) identify order-based relationships. According to one embodiment, the following secondary indexes are created on the PATH table.

```
PATHID_INDEX on (pathid, rid)
ORDERKEY_INDEX on (rid, order_key)
VALUE INDEXES
PARENT_ORDERKEY_INDEX on (rid,
    SYS_DEWEY_PARENT(order_key))
        PATHID_INDEX
```

Figure 3:
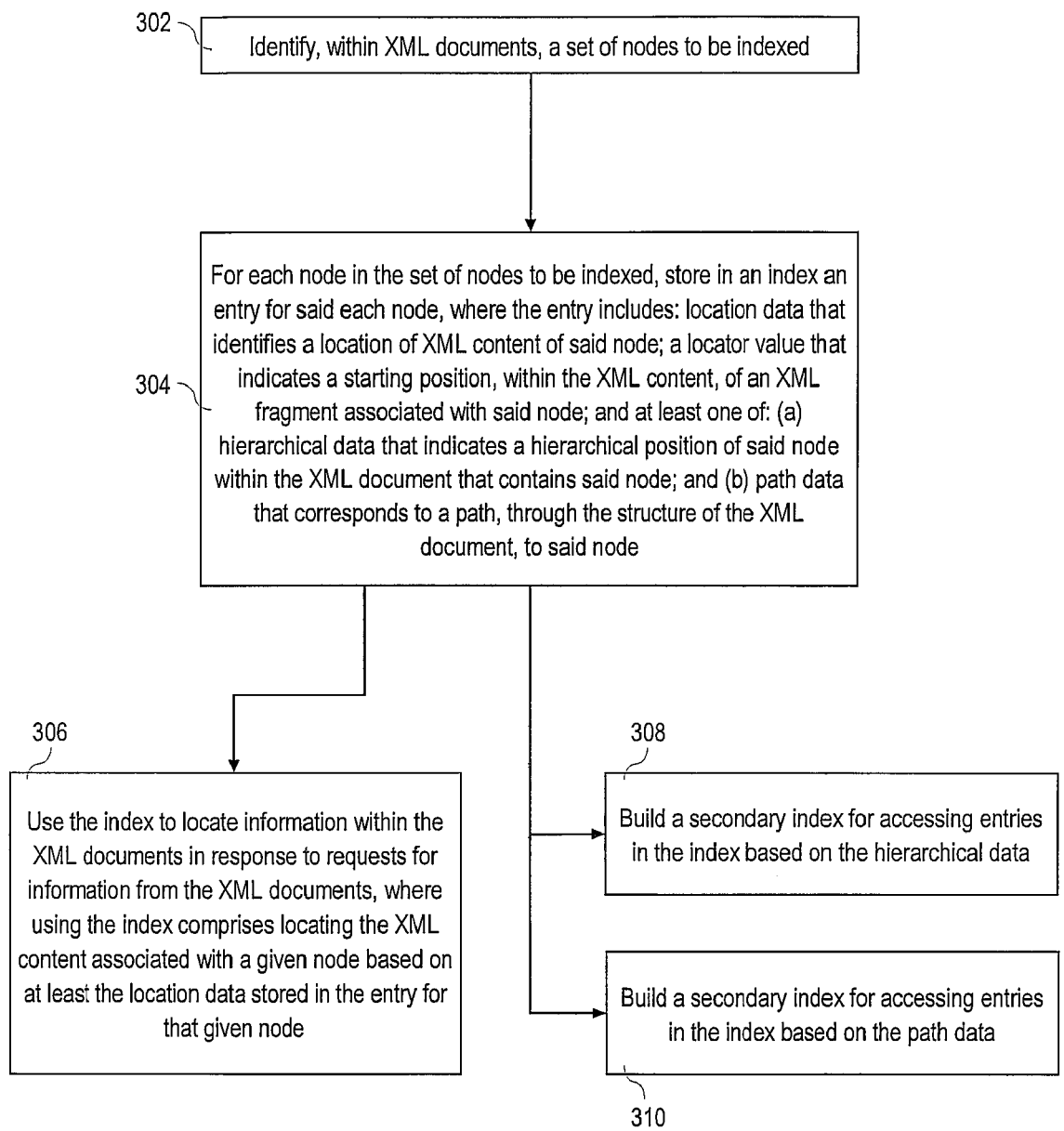
FIG. 3 is a flow diagram that illustrates a method for accessing information from XML documents according to an example embodiment.

FIG. 3 is a flow diagram that illustrates a method for accessing information from XML documents according to an example embodiment. In step 302, a set of nodes that are to be indexed are identified within the XML documents. In step 304, an entry is stored in an index for each node in the set of nodes that are to be indexed. The entry for a given node includes: location data that identifies a location of XML content associated with the given node; a locator value that indicates a starting position, within the XML content, of an XML fragment that is associated with the given node; and at least one of: (a) hierarchical data that indicates a hierarchical position of the given node within the XML document that contains the given node; and (b) path data that corresponds to a path, through the structure of the XML document, to the given node. After the entries for the set of nodes are stored in the index, one or more of steps 306, 308, and 310 may be performed. In step 306, the index may be used to locate information within the XML documents in response to requests for information from the XML documents. Using the index may comprise locating the XML content associated with a given node based at least on the location data stored in the index entry for the given node. In step 308, a secondary index for accessing the entries in the index may be built based on the hierarchical data. In step 310, a secondary index for accessing the entries in the index may be built based on the path data.

The PATHID_INDEX is build on the pathid, rid columns of the PATH table. Thus, entries in the PATHID_INDEX are in the form (keyvalue, rowid), where keyvalue is a composite value representing a particular pathid/rid combination, and rowid identifies a particular row of the PATH table.

When (1) the base table row and (2) the pathid of a node are known, the PATHID_INDEX may be used to quickly locate the row, within the PATH table, for the node. For example, based on the key value "3.R1", the PATHID_INDEX may be traversed to find the entry that is associated with the key value "3.R1". Assuming that the PATH table is populated as illustrated above, the index entry would have a rowid value of 3. The rowid value of 3 points to the third row of the PATH table, which is the row for the node associated with the pathid 3 and the rid R1.

The ORDERKEY_INDEX

The ORDERKEY_INDEX is built on the rid and orderkey columns of the PATH table. Thus, entries in the ORDERKEY_ INDEX are in the form (keyvalue, rowid), where keyvalue is a composite value representing a particular rid/orderkey combination, and rowid identifies a particular row of the PATH table.

When (1) the base table row and (2) the orderkey of a node are known, the ORDERKEY_INDEX may be used to quickly locate the row, within the PATH table, for the node. For example, based on the key value "R1.'1.2'", the ORDERKEY_ INDEX may be traversed to find the entry that is associated with the key value "R1.'1.2'". Assuming that the PATH table is populated as illustrated above, the index entry would have a rowid value of 3. The rowid value of 3 points to the third row of the PATH table, which is the row for the node associated with the orderkey 1.2 and the rid R1.

The Value Indexes

Just as queries based on path lookups can be accelerated using the PATHID_INDEX, queries based on value lookups can be accelerated by indexes built on the value column of the PATH table. However, the value column of the PATH table can hold values for a variety of data types. Therefore, according to one embodiment, a separate value index is built for each data type stored in the value column. Thus, in an implementation in which the value column holds strings, numbers and timestamps, the following value (secondary) indexes are also created:

```
STRING_INDEX on
    SYS_XMLVALUE_TO_STRING(value)
NUMBER_INDEX on
    SYS_XMLVALUE_TO_NUMBER(value)
```

```
            -continued

TIMESTAMP_INDEX on
        SYS_XMLVALUE_TO_TIMESTAMP(value)
```

These value indexes are used to perform datatype based comparisons (equality and range). For example, the NUMBER value index is used to handle number-based comparisons within user Xpaths. Entries in the NUMBER_INDEX may, for example, be in the form (number, rowid), where the rowid points to a row, within the PATH table, for a node associated with the value of "number". Similarly, entries within the STRING_INDEX may have the form (string, rowid), and entries within the TIMESTAMP_INDEX may have the form (timestamp, rowid).

The format of the values in the PATH table may not correspond to the native format of the data type. Therefore, when using the value indexes, the database server may call conversion functions to convert the value bytes from stored format to the specified datatype. In addition, the database server applies any necessary transformations, as shall be described hereafter. According to one embodiment, the conversion functions operate on both RAW and BLOB values and return NULL if the conversion is not possible.

By default, the value indexes are created when the XML index is created. However, users can suppress the creation of one or more of value indexes based on the knowledge of query workload. For example, if all XPath predicates involve string comparisons only, the NUMBER and TIMESTAMP value indexes can be avoided.

Figure 6:
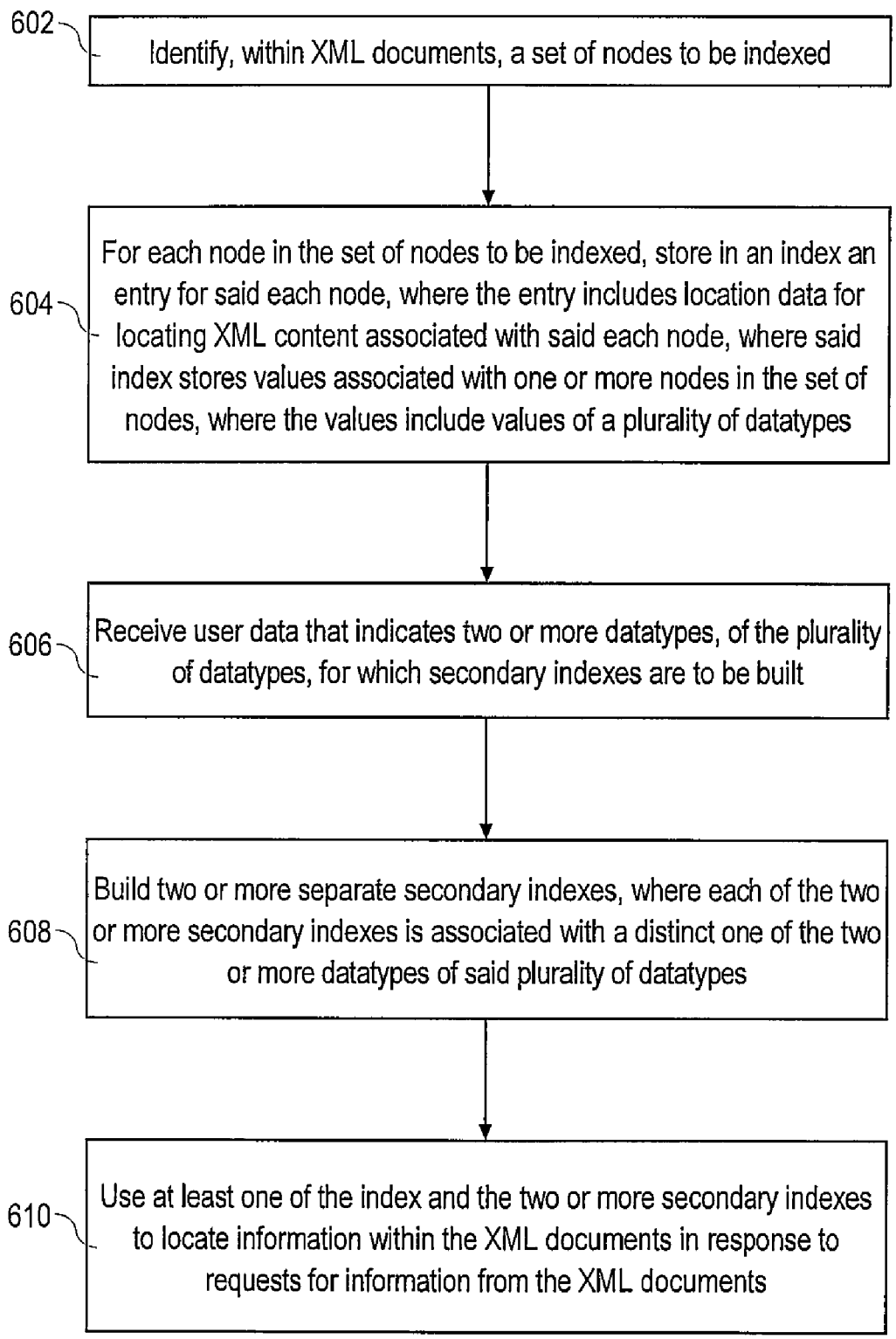
FIG. 6 is a flow diagram that illustrates a method for accessing information from XML documents according to an example embodiment.

FIG. 6 is a flow diagram that illustrates a method for accessing information from XML documents according to an example embodiment. In step 602, a set of nodes that are to be indexed are identified within the XML documents. In step 604, an entry is stored in an index for each node in the set of nodes that are to be indexed, where the entry for a given node includes location data for locating XML content associated with the given node. The index stores values associated with one or more nodes in the set of nodes, where the values stored in the index include values of a plurality of datatypes. In step 606, user data is received. The user data indicates two or more datatypes, of the plurality of datatypes, for which secondary indexes are to be built. In step 608, tow or more separate secondary indexes are built. Each of the two or more secondary indexes is associated with a distinct one of the two or more datatypes indicated in the user data. In step 610, at least one of the index and the two or more secondary indexes may be used to locate information within the XML documents in response to requests for information from the XML documents.

PARENT_ORDERKEY_INDEX

According to one embodiment, the set of secondary indexes built on the PATH table include a PARENT_ORDERKEY_INDEX. Similar to the ORDER_KEY index, the PARENT_ORDERKEY_INDEX is built on the rid and order_key columns of the PATH table. Consequently, the index entries of the PARENT_ORDERKEY_INDEX have the form (keyvalue, rowid), where keyvalue is a composite value that corresponds to a particular rid/order_key combination. However, unlike the ORDER_KEY index, the rowid in a PARENT_ORDERKEY_INDEX entry does not point to the PATH table row that has the particular rid/order_key combination. Rather, the rowid of each PARENT_ORDER-KEY_INDEX entry points to the PATH table row of the node that is the immediate parent of the node associated with the rid/order_key combination.

For example, in the populated PATH table illustrated above, the rid/order_key combination "R1.'1.2'" corresponds to the node in row 3 of the PATH table. The immediate parent of the node in row 3 of the PATH table is the node represented by row 1 of the PATH table. Consequently, the PARENT_ORDERKEY_INDEX entry associated with the "R1.'1.2'" key value would have a rowid that points to row 1 of the PATH table.

Figure 4:
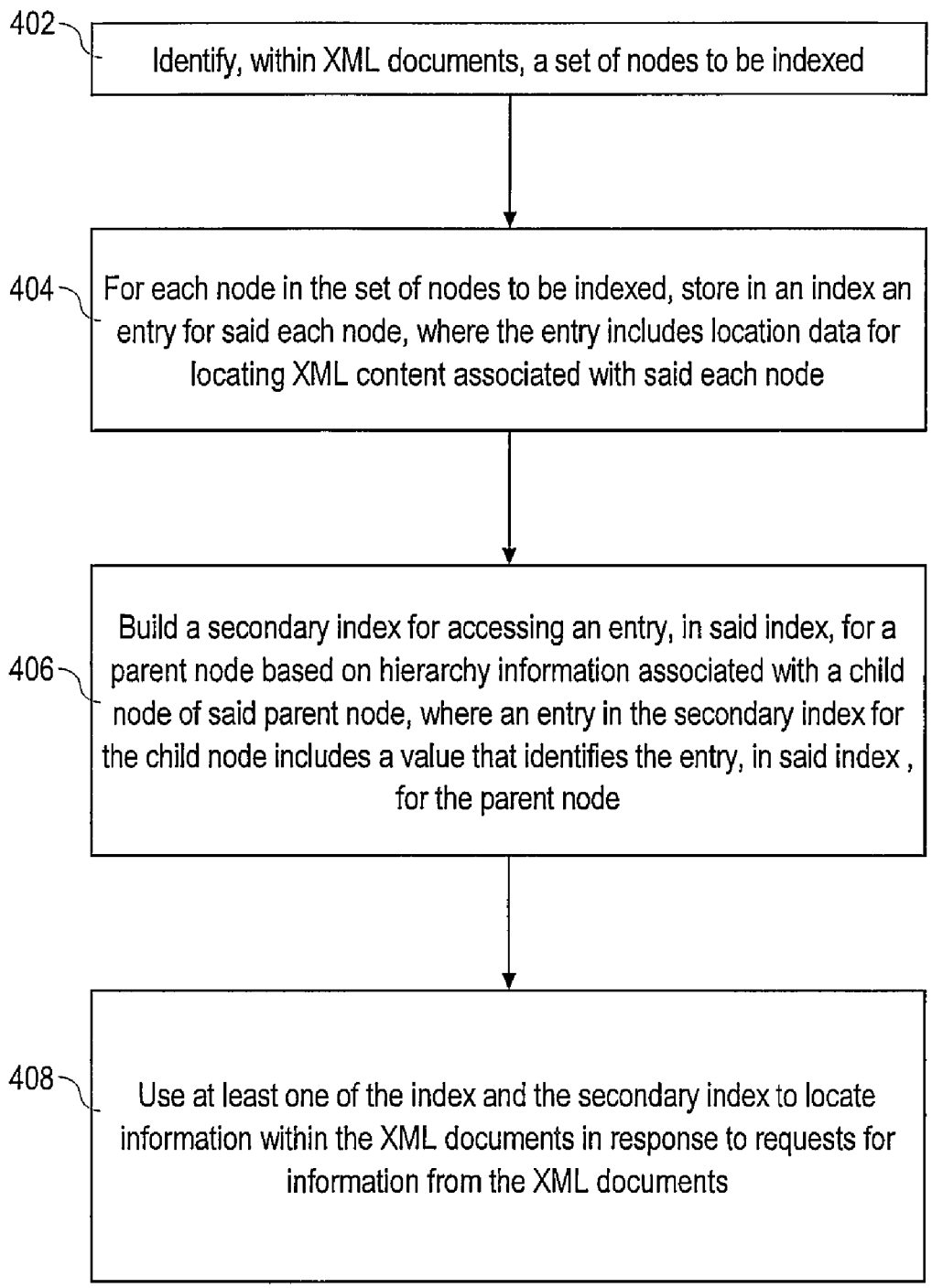
FIG. 4 is a flow diagram that illustrates a method for accessing information from XML documents according to an example embodiment.

FIG. 4 is a flow diagram that illustrates a method for accessing information from XML documents according to an example embodiment. In step 402, a set of nodes that are to be indexed are identified within the XML documents. In step 404, an entry is stored in an index for each node in the set of nodes that are to be indexed, where the entry for a given node includes location data for locating XML content associated with the given node. In step 406, a secondary index is built for accessing an entry, in the index, for a parent node based on hierarchy information associated with a child node. An entry in the secondary index for a child node includes a value that identifies the entry, in the index, for the parent node. In step 408, at least one of the index and the secondary index may be used to locate information within the XML documents in response to requests for information from the XML documents.

Creating an XML Index

According to one embodiment, an XML index is created within a database in response to an index creation command received by a database server. For the purpose of explanation, the creation of an XML index shall be described in a context in which the XML documents to be indexed will be stored in an XMLType column of a relational table.

For example, assume that the base structure is a table stylesheet_tab that stores stylesheets as XMLType identified by an id column. Such a table may be created, for example, using the command:

```
    CREATE TABLE stylesheet_tab (id number, stylesheet
        XMLType);
```

An XML index may be created on the stylesheet column of stylesheet_tab to speed up queries involving XPath predicates and retrieval of fragments based on Xpaths. According to one embodiment, such an XML index may be created using the following command:

```
    CREATE INDEX ss_tab_xmli ON stylesheet_tab(stylesheet)
        INDEXTYPE IS XML INDEX;
```

The following command is an example of how an XML Index may be created on schema-based XMLType:

```
    CREATE TABLE purchaseorder OF XMLType
        XMLSchema
            http://xmlns.oracle.com/xdb/documentation/purch
            aseOrder.xsd"
        ELEMENT "PurchaseOrder";
```

```
        CREATE INDEX purchaseorder_xmli ON
            purchaseorder(object_value)
            INDEXTYPE IS XML INDEX;
```

The foregoing commands are merely examples of commands that may be submitted to a database server to cause the database server to create an XML index. The techniques described herein are not limited to any form or syntax for specifying the creation of indexes.

According to one embodiment, the index creation command includes parameters that allow a user to specify various characteristics of the XML index, such as:

Which paths to include or exclude from the set of indexed paths

The names of the PATH table and secondary indexes storage options for the PATH table and secondary indexes (e.g. whether the PATH table should be stored as a partitioned table, an Index Organized Table, etc.)

rules for handling values

The column type of the value column (e.g. RAW or BLOB)

The rules for handling values may specify, for example, whether values should be treated as case sensitive, whether values should be normalized (and if so, how the normalization should be performed), and how to handle values for mixed content nodes (nodes that have both a value and child nodes). With respect to mixed content nodes, the rules may specify, for example, that the values associated with mixed content nodes should be ignored, concatenated, or otherwise treated specially. These are merely examples of the value handling rules that may be specified by a user. The set of available rules may vary from implementation to implementation, and may further vary based on the types of values involved.

When the user creates the XML index, the underlying PATH table and secondary indexes are automatically created. By default, the names of the PATH table and the secondary indexes are generated by the system based on the name of the XML index. However, the user can explicitly specify the name of these objects.

By default, the storage options for the PATH table and secondary indexes are derived from the storage properties of the base table on which the XML index is created. However, the user can also explicitly specify the storage properties for these objects.

The following example illustrates how the number index is created in a separate table space from the PATH table.

```
        CREATE INDEX POIndex ON purchaseOrder
            INDEXTYPE IS XML INDEX
            PARAMETERS       'PATHS
                                 (/PurchaseOrder/LineItems//*,
            /PurchaseOrder/LineItems/LineItem/@ItemNumber)
                             PATH TABLE
                             POIndex_path_table tablespace
            tab_tbs
                             VALUE STORE AS RAW(50)
                             NUMBER INDEX
                             POIndex_num_idx tablespace
            idx_tbs'
```

User Selection of which Paths to Index

According to one embodiment, a mechanism is provided by which a user may specify rules that determine which XML paths are to be indexed by an XML index. Specifically, a user may register rules that expressly include certain XML paths, and/or rules that expressly exclude certain XML paths.

According to one embodiment, when the user creates the XML index, by default, all nodes in the base documents are indexed (i.e. there are rows in the PATH table corresponding to all the nodes in the documents). However, the user can explicitly specify the set of nodes (subtrees) to be indexed—thereby omitting the remaining nodes from the PATH table. This is typically used to exclude fragments which are known to be useless from a query standpoint. By reducing the number of indexed nodes, the space usage and management efficiency of the XML index can be improved.

According to one embodiment, an initial registration of rules may occur at the time the XML index is created. For example, assume that the documents that are to be indexed are stored in a purchaseOrder table. If the user wants to index all the Lineitem elements and their children, and the purchase order reference number and requester, then the following Create Index DDL can be issued:

```
        CREATE INDEX POIndex1 ON purchaseOrder
            INDEXTYPE IS XML INDEX
            PARAMETERS       'PATHS      (/PurchaseOrder/LineItems//*,
                                          /PurchaseOrder/Reference,
                                          /PurchaseOrder/Requestor)
                             PATH TABLE POIndex_path_table'
```

In this example, the POIndex_path_table denotes the name of the table used by the domain index to store the index data. In the preceding example, the rules expressly include certain paths. All paths not expressly included by the rules will be excluded from the index. The rule /PurchaseOrder/LineItems//* includes a wildcard symbol "*". Consequently, the rule expressly includes the path /PurchaseOrder/LineItems and the path to all nodes that descend from the path /PurchaseOrder/LineItems. This is merely one example of how wildcards may be used in the rules. According to one embodiment, the path selection rule mechanism supports wildcards in any number of contexts. For example, the rule /nodex/*/nodey/nodez selects all paths that (1) descend from /nodex/ and (2) terminate in /nodey/nodez, regardless of the path between nodex and nodey/nodez.

A user may also specify rules that expressly exclude paths. For example, to index all the paths of the documents except the Lineitem descriptions and the purchaseOrder actions, the following Create Index DDL is used to create the index:

```
        CREATE INDEX POIndex2 ON purchaseOrder
        INDEXTYPE IS XML INDEX PARAMETERS 'PATHS EXCLUDE
             /PurchaseOrder/LineItems/LineItem/Description,
             /PurchaseOrder/Actions)
             PATH TABLE POIndex_path_table2'
```

Figure 5:
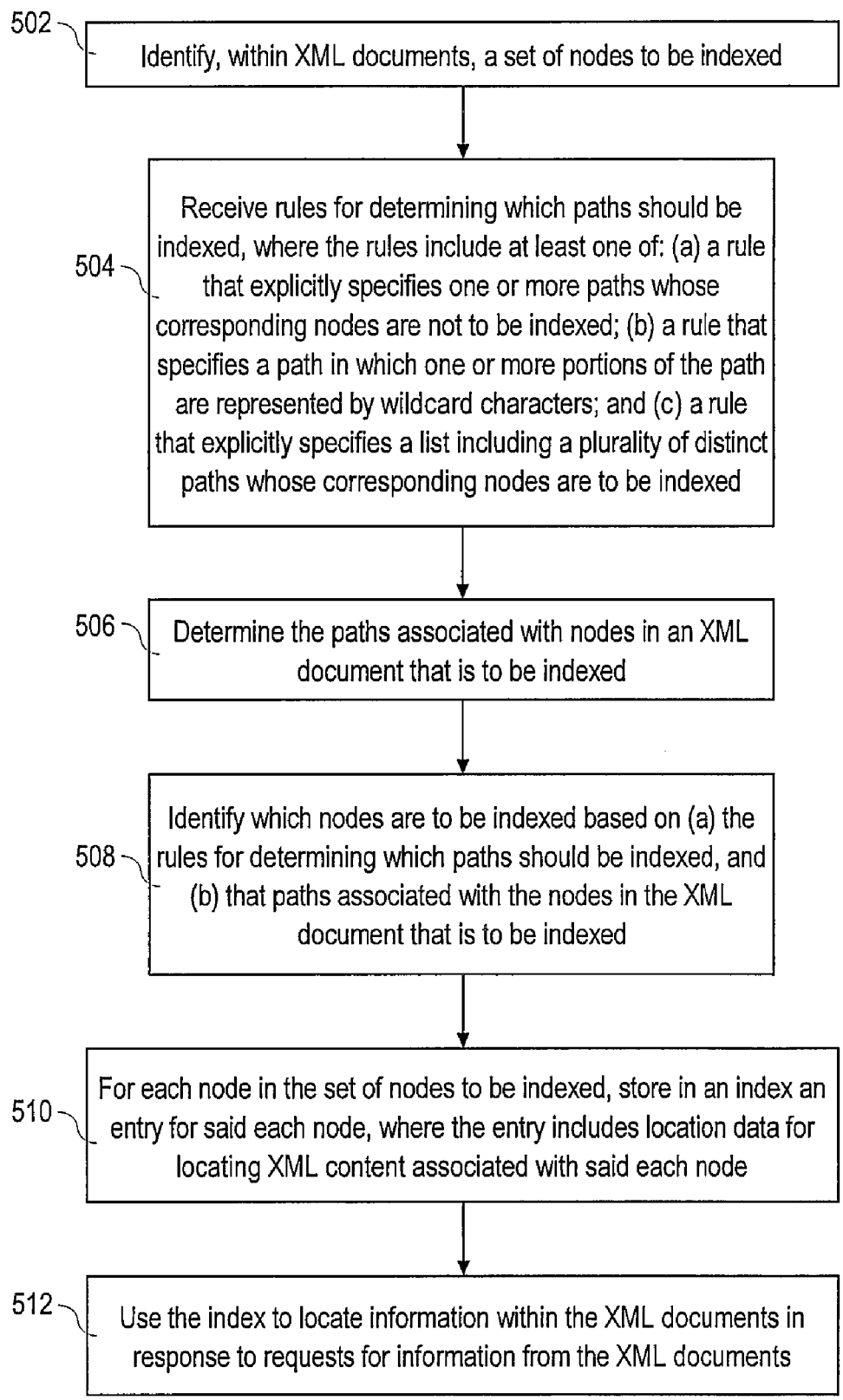
FIG. 5 is a flow diagram that illustrates a method for accessing information from XML documents according to an example embodiment.

FIG. 5 is a flow diagram that illustrates a method for accessing information from XML documents according to an example embodiment. In step 502, a set of nodes that are to be indexed are identified within the XML documents. Identifying the set of nodes may include performing steps 504, 506, and 508. In step 504, rules are received for determining which paths should be indexed. The received rules may include at least one of: (a) a rule that explicitly specifies one or more paths whose corresponding nodes are not to be indexed; (b) a rule that specifies a path in which one or more portions of the path are represented by wildcard characters; and (c) a rule that explicitly specifies a list including a plurality of distinct paths whose corresponding nodes are to be indexed. In step 506 the paths, which are associated with nodes in an XML document that is to be indexed, are determined. In step 508, the nodes which are to be indexed are identified based on (a) the rules for determining which paths should be indexed, and (b) the paths associated with the nodes in the XML document that is to be indexed. In step 510, an entry is stored in an index for each node in the set of nodes that are to be indexed, where the entry for a given node includes location data for locating XML content associated with the given node. In step 512, the index may be used to locate information within the XML documents in response to requests for information from the XML documents.

Adding a Document to the Set of Indexed Documents

When new XML documents need to be indexed, the path, order and value information is collected and stored in the XML index. According to one embodiment, when an XML document is added to the repository of indexed XML documents, the new XML document is parsed to identify the paths to the nodes contained therein. Once the paths for the nodes within the new XML document have been identified, the database server determines which of the nodes contained in the new XML document are to be indexed. The database server then updates the XML index based on each of those nodes.

Referring to FIG. 1, it is a flowchart illustrating how new XML documents are processed, according to one embodiment of the invention. In FIG. 1, steps 102 and 108 define a loop during which each node within the new XML document is processed. Specifically, at step 102, a previously unprocessed node is selected. During the first iteration, the first node selected for processing will be the root node of the new XML document.

At step 104, the database server determines the path of the currently selected node. At step 106, the database server determines, based on the path, whether the currently selected node is to be indexed. Specifically, when the user has specified a subset of paths to be indexed, index entries are only added for those nodes that correspond to the specified subset of paths. According to one embodiment, step 106 involves matching the path associated with the current node against the path selection rules to check if the current node should be indexed. If (1) the user has registered rules that indicate which paths should be included and (2) the path associated with the current node does not match any of the user specified paths, then the subtree (fragment) rooted at the node is omitted from the index. On the other hand, if (1) the rules specify which paths are to be excluded from indexing and (2) the node matches any of the user specified paths to exclude, then the fragment rooted at the node is omitted from the index. The matching operation may be performed, for example, using a finite automata.

If it is determined at step 106 that the selected node is not associated with a path that is to be indexed, then control passes to step 108. At step 108, the database server determines whether the new XML document has any more nodes to be processed. If the new XML document does not have any more nodes to be processed, then the process of updating the XML index is complete. Otherwise, if the new XML document does have more nodes to be processed, then control passes back to step 102 and another node is processed.

If at step 106 it is determined that the current node is to be indexed, then the fragment rooted at the node is added to the index. In addition, all its ancestors (element nodes until the root) are also added to the index. Finally, any namespace attributes within the ancestor element nodes are also added to the index.

The operation of processing a node to be indexed is broken out more specifically in FIG. 1, where at step 110 it is determined whether the path associated with the current node as been assigned a PATHID. In the case where the exact path did not exist in previously indexed XML documents, the path may not have been assigned a PATHID. Under such circumstances, control passes to step 112 where a PATHID is assigned to the path. The new PATHID-to-path mapping is then stored within the database.

At step 114, a row containing information about the current node is added to the PATH table. At step 116 the PATHID, ORDERKEY and PARENT_ORDERKEY indexes are updated with entries for the current node. As mentioned above, the PATHID and ORDERKEY entries will point to the new row for the current node, while the PARENT_ORDERKEY entry will point to the PATH table row for the parent of the current node.

At step 118, it is determined whether the current node is associated with a value. If the current node is not associated with a value, then control passes back to step 108. If the current node is associated with a value, and a value index has been created for the datatype of the value, then at step 120 an index entry is added to the value index associated with that particular datatype. Control then passes back to step 108.

According to one embodiment, even if a node is associated with a path that is not to be indexed, the node is indexed if the node is an ancestor of any node that is indexed. Thus, even though a user specified that only paths that match /a/b/c/* should be included, nodes associated with the paths /a, /a/b and /a/b/c will also be indexed as long as they are ancestors of any node associated with a path that matches the pattern /a/b/c/*.

Altering an XML Index

According to one embodiment, a mechanism is provided for altering characteristics of an XML index after the index has been created. Post-creation alteration of the XML index may be performed, for example, in response to an alter index statement.

An important use of the alter index statement for an XML index is to add or delete the indexed paths. According to one embodiment, new paths can be added to the index through the following Alter Index DDL:

```
ALTER INDEX POIndex
    PARAMETERS  'PATHS  (/PurchaseOrder/Reference,
                         /PurchaseOrder/Actions/Action//*)'
```

This DDL command indexes all the purchase order references and all the children of Action elements, in case they are not already indexed by the index. Similarly, the following DDL removes these paths from the index in case they are already indexed:

```
ALTER INDEX POIndex
    PARAMETERS  'PATHS EXCLUDE (/PurchaseOrder/Reference,
/PurchaseOrder/Actions/Action//*)'
```

An Alter Index Rename DDL allows the user to change the name of the index without explicitly dropping and creating it as illustrated in the following example:

---
ALTER INDEX POIndex RENAME PONewIndex

---

Determining Whether the XML Index can be Used

At query time, if the query XPath can be statically determined to be a subset of the user specified Xpaths (and hence guaranteed to be in the index), then the XML index may be used to answer the query. If the subset relationship cannot be determined at compile-time of the query, then the XML index is not used to satisfy the query.

For example, consider the XML index POIndex1 created by the statement:

---
```
CREATE INDEX POIndex1 ON purchaseOrder
INDEXTYPE IS XML INDEX
PARAMETERS    'PATHS    (/PurchaseOrder/LineItems//*,
                         /PurchaseOrder/Reference,
                         /PurchaseOrder/Requestor)
              PATH TABLE POIndex_path_table'
```
---

The XML index may be used to answer the query XPath /PurchaseOrder/LineItems/LineItem/Description. However, the XML index cannot be used to answer the query XPATH //Description, because there could be a <Description> element under a path different from /PurchaseOrder/LineItems.

Using the XML Index to Answer XPATH Queries

The XML index can be used to satisfy XPath queries by decomposing them into simple paths and predicates on values. The resulting decomposed pieces are translated into SQL queries on the index PATH_TABLE. According to one embodiment, the input to the index access method is a compound expression that includes one or more of the following:

Simple (navigational) path expressions e.g. /a/b

Simple value expressions e.g. /a/b/c>50

Structural Join (i.e. hierarchical relationship) between expressions e.g. The XPath expression /a/b[c>50] is represented as (/a/b)PARENT-OF(/a/b/c>50)

Consider a query with a simple predicate, such as /a/b/c=foo. Such a query may be executed against the PATH table as follows:

---
```
SELECT DISTINCT rid FROM path_table
  WHERE pathid = :1 AND xmlvalue_to_string(value) = 'foo';
```
---

The ID for path /a/b/c is bound as variable 1. There are multiple execution plans for this query. According to one embodiment, a query optimizer picks the best execution plan based on costs. The database server could either (1) use the secondary index on pathid, (2) use the secondary index on xmlvalue_to_string(value), or (3) use both, and bitmap-and the results.

Consider a query that specifies a fragment lookup, such as XPath /a/b/c. Such a query may be executed against the PATH table using the statement:

---
```
SELECT rid FROM path_table WHERE pathid = :1 ORDER BY
  order_key;
```
---

The ID for the path /a/b/c is bound as variable 1. The resulting matches are returned by the query in document order. All fragments corresponding to a single document are concatenated, if required.

Consider a query that specifies a fragment lookup based on simple predicate, such as /a/b[c=foo]. The normalized representation of the input XPath is (/a/b)PARENT-OF(/a/b/c=foo). The following query may be used to lookup matches for path /a/b, and also matches for simple predicate (/a/b/c=foo).

---
```
SELECT p1.rid, p1.offset FROM path_table p1, path_table p2
  WHERE p1.pathid = :1 AND p2.pathid = :2
  AND xmlvalue_to_string(p2.value) = 'foo'
  AND SYS_DEWEY_PARENT(p1.order_key) = p2.order_key
  ORDER BY p1.rid, p1.offset;
```
---

The results are then merged using the structural join operator—which is expressed using the Dewey order keys. The Ids for paths /a/b and /a/b/c are bound as variables 1 and 2. According to one embodiment, a cost-based optimizer picks the best execution plan of the various possible execution plans.

The XML index may also be used to perform datatype-aware operations. There are multiple mechanisms by which datatype information gets attached to the XPath predicates. For example:

Use of XML Schema. If the base table column has an associated XML Schema, then the user XPath is type-checked against the XML Schema, thereby associating appropriate datatypes with the expressions.

Explicit Type Coercion. XPath provides operators for explicitly type coercion.

Implicit Type Coercion. XPath defines some implicit type casting rules. Eg. If the RHS of a comparison operator is a NUMBER, the LHS is also implicitly coerced to a NUMBER.

According to one embodiment, in all these scenarios, the input to the XML index access method is an XPath expression that has associated datatype information. The datatype information is used within the generated SQL query to ensure that the appropriate value index is chosen. For example, the type-checked XPath as follows:

---
```
SYS_XMLVALUE_TO_NUMBER(/a/b/c) > 10.567
```
--- results in the following query against the PATH table which uses the NUMBER value index:

---
```
SELECT DISTINCT rid FROM path_table
WHERE pathid = :1 AND sys_xmlvalue_to_number(value) > 10.567;
```
---

Using an XML index, as described herein, may result in a variety of benefits, including: A large set of XPaths can be efficiently evaluated. XPaths involving datatype aware comparisons can be satisfied. Fragments can be efficiently extracted from the original XML document. The user can choose to index only a subset of the paths and thus avoid bloating the index. The index value can be customized based on the application needs. The ability to index even non-schema XML documents would satisfy query requirements for a large class of users. It would enable them to store all their XML documents in Oracle without worrying about query performance.

Syntax

Embodiments have been described in a context in which a database server creates and maintains an XML index in response to commands received by the database server. The commands must conform to a language understood by the database server. According to one embodiment of the invention, the syntax used for the various DDL commands that involve an XML index is as follows:

---

CREATE INDEX
Syntax
   CREATE INDEX <index_name> ON [ <schema> . ] <table_name> ( <column_name> )
   INDEXTYPE IS [ <schema> .] XMLINDEX
   [ LOCAL ]
   [ PARALLEL ]
   [ PARAMETERS '<parameter_clause>' ] ;
Examples
   Create index xmldoc_idx on xmldoc_tab (xmldoc)
   indextype is XMLINDEX
   Parameters 'PATHS ( /a/b/c, //e ) ,
   PATH TABLE xmldoc_idx_pathtab';

---

According to one embodiment, the domain index is equi-partitioned to the parent XML table. If the XML table is not partitioned, then the domain index is not partitioned. The PATH TABLE and its secondary indexes are also equi-partitioned to the XML table.

---

Syntax for the PARAMETERS clause:
   <parameters_clause> ::= <parameter_clause > [ ,
   <parameters_clause> ]
   <parameter_clause> ::= [   <paths_clause> |
            <path_table_clause> |
               <pathid_index_clause> |
               <orderkey_index_clause> |
               <value_index_clause>  ]
   <paths clause> ::=   PATHS (   [ <path_list_clause> |
   <namespaces_clause> ]
* )
   <path_list_clause> ::= { <include_list_clause> |
   <exclude_list_clause> }
   <include_list_clause> ::= <xpath_list_clause>
   <exclude_list_clause> ::= EXCLUDE
   ( <xpath_list_clause> )
   <xpath_list_clause> ::= <xpath> [ , <xpath_list_clause> ]
   <namespaces_clause> ::= NAMESPACES
   ( <namespace_list_clause> )
   <namespace_list_clause> ::= <namespace>
   [ , <namespace_list_clause> ]
           <path_table_clause> ::= PATH TABLE
           [ <identifier> ]
                 [ ( <segment_attributes_clause>
                  <table_properties>
   ) ]
           <pathid_index_clause> ::= PATH
           <index_parameters>
           <orderkey_index_clause> ::= ORDER KEY
           <index_parameters>
                [ PARENT
                <index_parameters> ]

---

-continued

<value_index_clause> ::=
      VALUE STORE AS <value_type> [
   <value_idx_clause> ]
      <value_type> :: = { RAW [ (
      <integral_number> ) ] | BLOB }
      <value_idx_clause> ::= <value_idx1_clause>
      [ , <value_idx_clause> ]
      <value_idx_1 clause> ::= [ <string_parameters> |
   NUMBER |
TIMESTAMP ]
                        <index_parameters>
      <string_parameters> ::= STRING [
      <string_parameters1> [ ,
   <string_parameters> ] ]
   <string_parameters1> ::= NORMALIZED |
IGNORE_MIXED_TEXT |
CASE_INSENSITIVE
   <index_parameters> ::= [ INDEX [
   <identifier> ] [ (
   <index_attributes> ) ] ]

---

According to one embodiment, the PARAMETERS clause is used to specify the following:

Names and physical parameters (tablespace, etc) for the path table and secondary indexes. All six indexes on the PATH TABLE are created, even if not specified explicitly.

If the type for the column VALUE is explicitly specified to be BLOB, the values are then stored out-of-line in the BLOB segments. Otherwise, the values are stored inline as RAW data. The <size> for RAW is just an integral number.

The attributes for the STRING values are:
    NORMALIZED when all the leading and trailing whitespaces of the strings are to be removed
    IGNORE_MIXED_TEXT stores the value as NULL in presence of mixed text.
    CASE_INSENSITIVE when all the strings are to be converted into lower case.
  Note that the operations above apply before the storing of the values to the VALUE column (and before the creation of the secondary indexes on the PATH TABLE).

Set of paths to index. The user can control the set of indexed paths by specifying:
  Explicit list of paths to index. This can include wildcards and // axes. E.g. /a/b/c, /d/*, /x//y
  Explicit list of paths NOT to be index.

---

DROP INDEX
Syntax
   DROP INDEX <index_name>  ;
Examples
   Drop index xmldoc_idx;
Usage
•    The XML index is dropped along with its components,
   the underlying PATH
   TABLE and its secondary indexes.
ALTER INDEX
Syntax
   ALTER INDEX <index_name>
      PARAMETERS '<parameter_clause>'      |
      RENAME <new_index_name>      |
      REBUILD  [ ONLINE ] [ PARALLEL
      [ DEGREE <degree>]]
      |
      MODIFY PARTITION <partition_name>
      PARAMETERS
   '<parameter_clause>' |

```
            RENAME PARTITION <partition_name> TO
            <new_partition_name> |
            REBUILD PARTITION <partition_name>    [ ONLINE ]
                                                   [ PARALLEL
                                                   [ DEGREE
                <degree>]] |
            ...
            ;
Examples
        Alter index xmldoc_idx
            Parameters 'PATHS (/a/b/c, //e) , PATH TABLE
            xmldoc_idx_pathtab';
        Alter index xmldoc_idx RENAME TO new_xmldoc_idx;
        Alter index xmldoc_idx REBUILD;
        Alter index xmldoc_idx MODIFY PARTITION p1
            Parameters 'PATHS (/a/b/c, //e)';
        Alter index xmldoc_idx RENAME PARTITION
            xmldoc_idxpart TO
new_xmldoc_idxpart;
        Alter index xmldoc_idx REBUILD PARTITION
            xmldoc_idxpart;
```

Hardware Overview

Figure 2:
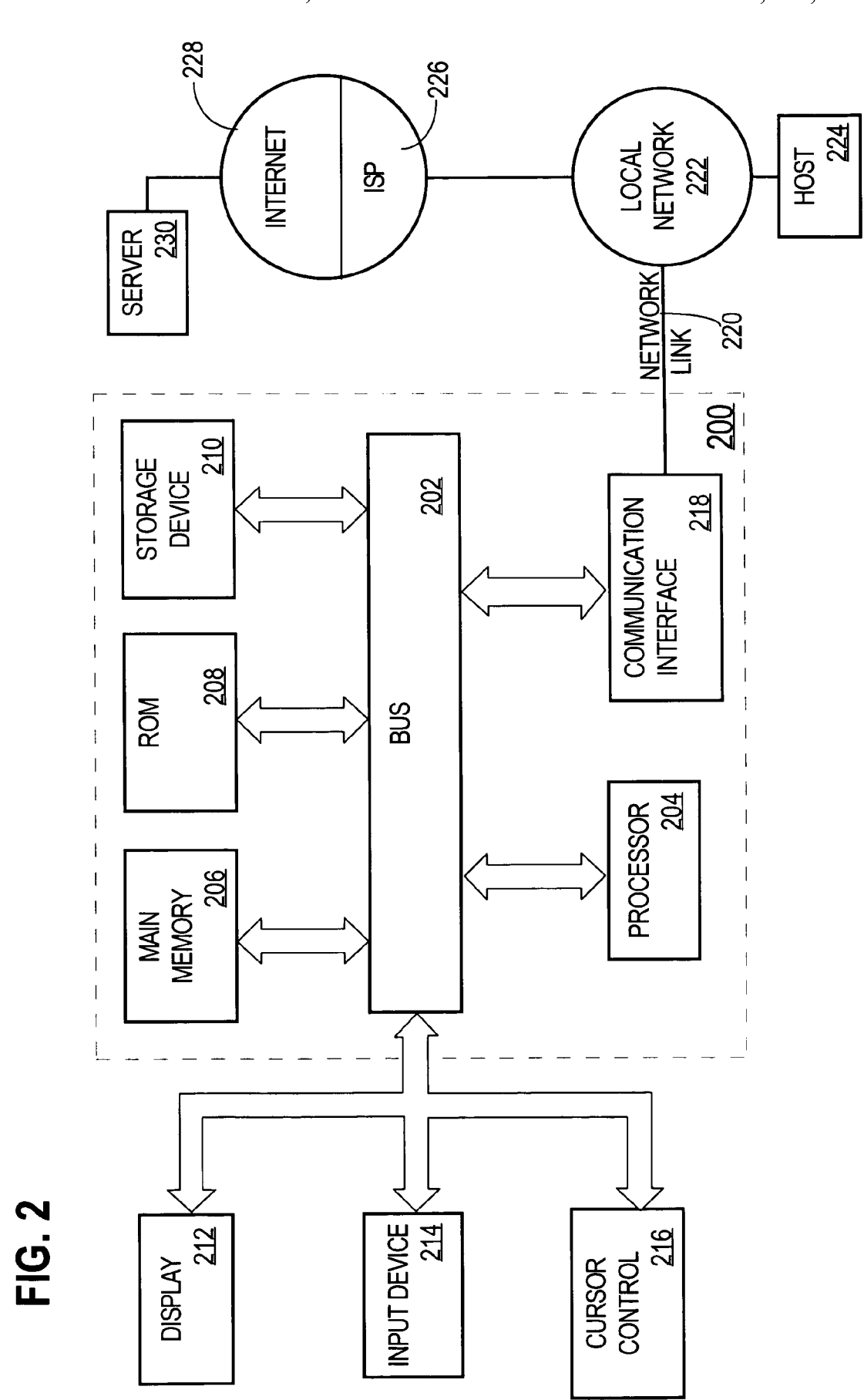
FIG. 2 is a block diagram of a system upon which the techniques described herein may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for accessing information from XML documents stored in a base table within a relational database, the method comprising the computer-implemented steps of:
   identifying, within the XML documents, a set of nodes to be indexed;
   for each node in the set of nodes to be indexed, storing, in an index, an entry for the node, wherein the entry for a given node includes location data that identifies a location of XML content associated with the XML document that contains the given node, and at least one of:
      (a) hierarchical data that indicates a hierarchical position of the given node within the XML document that contains the given node; and
      (b) path data that corresponds to a path, through the structure of the XML document that contains the given node, to the given node;
   wherein the entry for the given node further includes a locator value that indicates a starting position, within the XML content that resides at said location, of an XML fragment associated with the given node;
   wherein the index includes a plurality of index entries that correspond to a plurality of nodes of a particular XML document of the XML documents;
   wherein each of the plurality of index entries includes the same location data, which identifies the location within the base table, of XML content for the particular XML document;
   wherein the locator value for each of the plurality of index entries indicates a different starting position within the XML content for the particular XML document stored at the location within the base table, wherein the starting position indicated by the locator value in each given index entry, of the plurality of index entries, is the starting position of the XML fragment corresponding to the node associated with said each given index entry; and
   using the index to locate information within the XML documents in response to requests for information from the XML documents, wherein using the index comprises locating the XML content associated with the given node based on at least the location data.

2. The method of claim 1 wherein the index is implemented as a relational table, and the step of storing an entry for each node is performed by storing a row, within the relational table, for each node in the set of nodes.

3. The method of claim 1 wherein the index stores values associated with one or more nodes in the set of nodes.

4. A computer-readable storage medium storing one or more sequences of instructions which, when executed by one or more processors, causes the one or more processors to perform the method recited in claim 2.

5. A computer-readable storage medium storing one or more sequences of instructions which, when executed by one or more processors, causes the one or more processors to perform the method recited in claim 3.

6. The method of claim 1 further comprising
   building a secondary index for accessing an entry, in said index, for a parent node based on hierarchy information associated with a child node of said parent node;
   wherein an entry in the secondary index for the child node includes a value that identifies the entry, in said index, for the parent node.

7. A computer-readable storage medium storing one or more sequences of instructions which, when executed by one or more processors, causes the one or more processors to perform the method recited in claim 6.

8. The method of claim 1 wherein the step of identifying the set of nodes to be indexed includes the steps of:
   receiving rules for determining which paths should be indexed;
   wherein the rules include at least one of:
      (a) a rule that explicitly specifies one or more paths whose corresponding nodes are not to be indexed;
      (b) a rule that specifies a path in which one or more portions of the path are represented by wildcard characters; and
      (c) a rule that explicitly specifies a list including a plurality of distinct paths whose corresponding nodes are to be indexed;
   determining the paths associated with nodes in an XML document that is to be indexed; and
   identifying which nodes are to be indexed based on (a) the rules for determining which paths should be indexed, and (b) the paths associated with the nodes in the XML document that is to be indexed.

9. A computer-readable storage medium storing one or more sequences of instructions which, when executed by one or more processors, causes the one or more processors to perform the method recited in claim 8.

10. A computer-readable storage medium storing one or more sequences of instructions which, when executed by one or more processors, causes the one or more processors to perform the method recited in claim 1.

11. The method of claim 8 wherein the rules include the rule that explicitly specifies the one or more paths whose corresponding nodes are not to be indexed.

12. The method of claim 8 wherein the rules include the rule that specifies the path in which one or more portions of the path are represented by wildcard characters.

13. A computer-readable storage medium storing one or more sequences of instructions which, when executed by one or more processors, causes the one or more processors to perform the method recited in claim 12.

14. The method of claim 1 wherein the location data is disk location data that identifies a disk location of the XML content associated with the given node.

15. The method of claim 8 wherein the rules include the rule that explicitly specifies the list including the plurality of distinct paths whose corresponding nodes are to be indexed.

16. A computer-readable storage medium storing one or more sequences of instructions which, when executed by one or more processors, causes the one or more processors to perform the method recited in claim 15.

17. A computer-readable storage medium storing one or more sequences of instructions which, when executed by one or more processors, causes the one or more processors to perform the method recited in claim 14.

18. A computer-readable storage medium storing one or more sequences of instructions which, when executed by one or more processors, causes the one or more processors to perform the method recited in claim 11.

19. A method for accessing information from XML documents, the method comprising the computer-implemented steps of:
    identifying, within the XML documents, a set of nodes to be indexed;
    for each node in the set of nodes to be indexed, storing, in an index, an entry for the node, wherein the entry for a given node includes location data that identifies a location of XML content associated with the given node, and at least one of:
        (a) hierarchical data that indicates a hierarchical position of the given node within the XML document that contains the given node; and
        (b) path data that corresponds to a path, through the structure of the XML document that contains the given node, to the given node;
    wherein the entry for the given node further includes a locator value that indicates a starting position, within the XML content that resides at said location, of an XML fragment associated with the given node;
    wherein the index stores values associated with one or more nodes in the set of nodes;
    wherein the values stored in said index include values of a plurality of datatypes;
    building a secondary index for each of two or more datatypes of said plurality of datatypes; and
    using the index to locate information within the XML documents in response to requests for information from the XML documents, wherein using the index comprises locating the XML content associated with the given node based on at least the location data.

20. The method of claim 1 wherein the location data for a given node includes first data for locating an XML document, and second data for locating, within the XML document, information associated with the given node.

21. A computer-readable storage medium storing one or more sequences of instructions which, when executed by one or more processors, causes the one or more processors to perform the method recited in claim 20.

22. The method of claim 1 wherein:
    the entry for a given node includes hierarchical data that indicates a hierarchical position of the given node within the XML document that contains the given node; and
    the method further comprises building a secondary index for accessing entries in said index based on said hierarchical data.

23. A computer-readable storage medium storing one or more sequences of instructions which, when executed by one or more processors, causes the one or more processors to perform the method recited in claim 22.

24. The method of claim 1 wherein:
    the entry for a given node includes path data that corresponds to a path, through the structure of the XML document that contains the given node, to the given node; and
    the method further comprises building a secondary index for accessing entries in said index based on said path data.

25. A computer-readable storage medium storing one or more sequences of instructions which, when executed by one or more processors, causes the one or more processors to perform the method recited in claim 24.

26. A computer-readable storage medium storing one or more sequences of instructions which, when executed by one or more processors, causes the one or more processors to perform the method recited in claim 19.

27. A method for accessing information from XML documents, the method comprising the computer-implemented steps of:
    identifying, within the XML documents, a set of nodes to be indexed;
    for each node in the set of nodes to be indexed, storing, in an index, an entry for the node, wherein the entry for a given node includes location data for locating XML content associated with the given node;
    wherein the index stores values associated with one or more nodes in the set of nodes, wherein the values stored in said index include values of a plurality of datatypes;
    receiving user data that indicates two or more datatypes, of the plurality of datatypes, for which secondary indexes are to be built;
    building two or more separate secondary indexes, wherein each of the two or more secondary indexes is associated with a distinct one of the two or more datatypes of said plurality of datatypes; and
    using at least one of the index and the two or more secondary indexes to locate information within the XML documents in response to requests for information from the XML documents.

28. A computer-readable storage medium storing one or more sequences of instructions which, when executed by one or more processors, causes the one or more processors to perform the method recited in claim 27.

* * * * *

UNITED STATES PATENT AND TRADEMARK OFFICE
CERTIFICATE OF CORRECTION

PATENT NO. : 7,499,915 B2  Page 1 of 1
APPLICATION NO. : 10/884311
DATED : March 3, 2009
INVENTOR(S) : Chandrasekar et al.

It is certified that error appears in the above-identified patent and that said Letters Patent is hereby corrected as shown below:

In column 1, line 24, delete "extensible" and insert -- eXtensible --, therefor.

In column 17, line 48, delete "<paths clause>" and insert -- <paths_clause> --, therefor.

In column 18, line 9, delete "1 clause>" and insert -- 1_clause> --, therefor.

In column 18, line 56, below "Usage" delete "•".

Signed and Sealed this

Eighteenth Day of May, 2010

David J. Kappos
*Director of the United States Patent and Trademark Office*